(12) United States Patent
Paesang et al.

(10) Patent No.: US 10,786,069 B2
(45) Date of Patent: Sep. 29, 2020

(54) COLLAPSIBLE COOKING RING

(71) Applicant: Dick's Sporting Goods, Inc., Coraopolis, PA (US)

(72) Inventors: Chinawut Paesang, Sewickley, PA (US); Gregoire Aby-Eva, Pittsburgh, PA (US)

(73) Assignee: Dick's Sporting Goods, Inc., Coraopolis, PA (US)

( * ) Notice: Subject to any disclaimer, the term of this patent is extended or adjusted under 35 U.S.C. 154(b) by 0 days.

(21) Appl. No.: 15/842,459

(22) Filed: Dec. 14, 2017

(65) Prior Publication Data

US 2020/0022486 A1    Jan. 23, 2020

(51) Int. Cl.
*A45F 3/44* (2006.01)
*A47J 37/07* (2006.01)
*F16M 11/10* (2006.01)
*F16M 11/24* (2006.01)
*F16M 11/38* (2006.01)

(52) U.S. Cl.
CPC ............. *A45F 3/44* (2013.01); *A47J 37/0786* (2013.01); *F16M 11/10* (2013.01); *F16M 11/245* (2013.01); *F16M 11/38* (2013.01); *A47J 2037/0777* (2013.01); *F16M 2200/022* (2013.01); *F16M 2200/066* (2013.01)

(58) Field of Classification Search
CPC . A45F 3/44; A47J 2037/0777; A47J 38/0786; F16M 11/38; F16M 2200/022; F16M 2200/066
USPC ......... 248/176.1, 176.2, 440, 439, 166, 168, 248/172, 173, 558, 670, 448, 165, 924; 108/128, 137, 124, 155
See application file for complete search history.

(56) References Cited

U.S. PATENT DOCUMENTS

| | | | | |
|---|---|---|---|---|
| 496,183 | A * | 4/1893 | Bowen | 108/124 |
| 561,857 | A * | 6/1896 | Baxter | A47B 3/0815 126/30 |
| 651,773 | A * | 6/1900 | Smith | B65B 67/12 248/166 |
| 961,975 | A * | 6/1910 | Long | A47J 37/0763 126/30 |
| 982,302 | A * | 1/1911 | Roncaglia | F16M 11/20 126/30 |
| 1,125,286 | A * | 1/1915 | Flinchbaugh | B65B 67/12 248/101 |
| 1,132,061 | A * | 3/1915 | Backer | F16M 11/20 248/166 |
| 1,157,795 | A * | 10/1915 | Mix | A47C 9/00 108/128 |
| 1,477,652 | A * | 12/1923 | Koenig | A47C 9/105 108/128 |
| 1,523,960 | A * | 1/1925 | Harbison | A47B 3/0912 108/127 |
| 1,627,513 | A * | 5/1927 | Johnson | F24B 1/205 126/30 |
| 2,039,805 | A * | 5/1936 | Knight | A47B 37/04 108/128 |

(Continued)

*Primary Examiner* — Kimberly T Wood
(74) *Attorney, Agent, or Firm* — Fox Rothschild LLP

(57) ABSTRACT

A collapsible cooking device includes a central hub with a support surface positioned on one face of the central hub. A plurality of arm members are connected to the central hub. A plurality of leg members are further rotatably connected to the arm members and configured to nest within each of plurality of arm members. The entire device can fold in order to form a compact shape for travel and storage.

8 Claims, 9 Drawing Sheets

(56) References Cited

U.S. PATENT DOCUMENTS

| | | | | |
|---|---|---|---|---|
| 2,522,270 | A * | 9/1950 | Hoffmann | A47B 97/08 248/465 |
| 2,905,513 | A * | 9/1959 | Kane | A47B 3/00 108/128 |
| 3,837,328 | A * | 9/1974 | Schaffer | A47J 37/0763 126/29 |
| 5,174,197 | A * | 12/1992 | Upton | A47J 37/0763 126/25 R |
| 5,473,996 | A * | 12/1995 | Kendall | A47B 3/10 108/128 |
| 5,653,179 | A * | 8/1997 | Kendall | F16M 11/32 108/128 |
| 6,182,650 | B1 * | 2/2001 | Tuttle | F16M 11/247 126/30 |
| 6,213,436 | B1 * | 4/2001 | Hembree | F16M 11/125 248/167 |
| 6,719,250 | B2 * | 4/2004 | FitzSimons | A47J 33/00 126/30 |
| 6,899,306 | B1 * | 5/2005 | Huang | B25H 1/0042 108/118 |
| 6,945,243 | B1 * | 9/2005 | Walker | A47J 37/0623 126/9 R |
| 8,783,241 | B1 * | 7/2014 | Sauter | F24C 1/16 126/25 A |
| 9,357,875 | B1 * | 6/2016 | Guiliano | A47J 36/26 |
| 9,370,277 | B2 * | 6/2016 | Weaver | A47J 37/0786 |
| 2006/0102163 | A1 * | 5/2006 | Sanders | A47J 33/00 126/30 |
| 2006/0272630 | A1 * | 12/2006 | Sanders | A47J 33/00 126/9 R |
| 2007/0199555 | A1 * | 8/2007 | Gregory | F24C 1/02 126/9 R |
| 2012/0070556 | A1 * | 3/2012 | Wilson | A47J 33/00 426/523 |

* cited by examiner

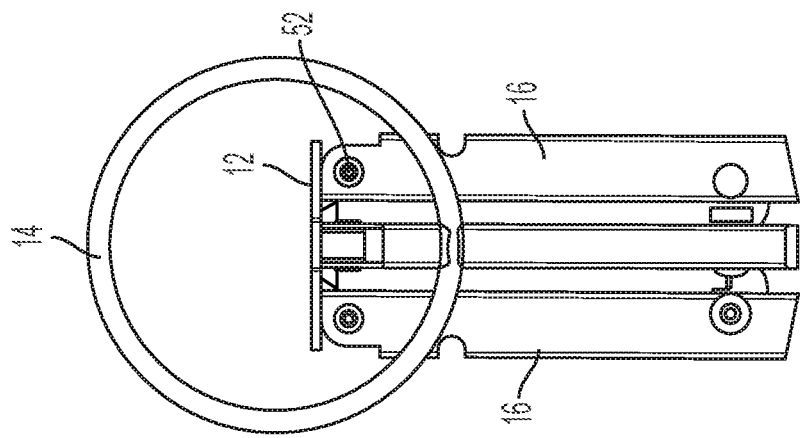
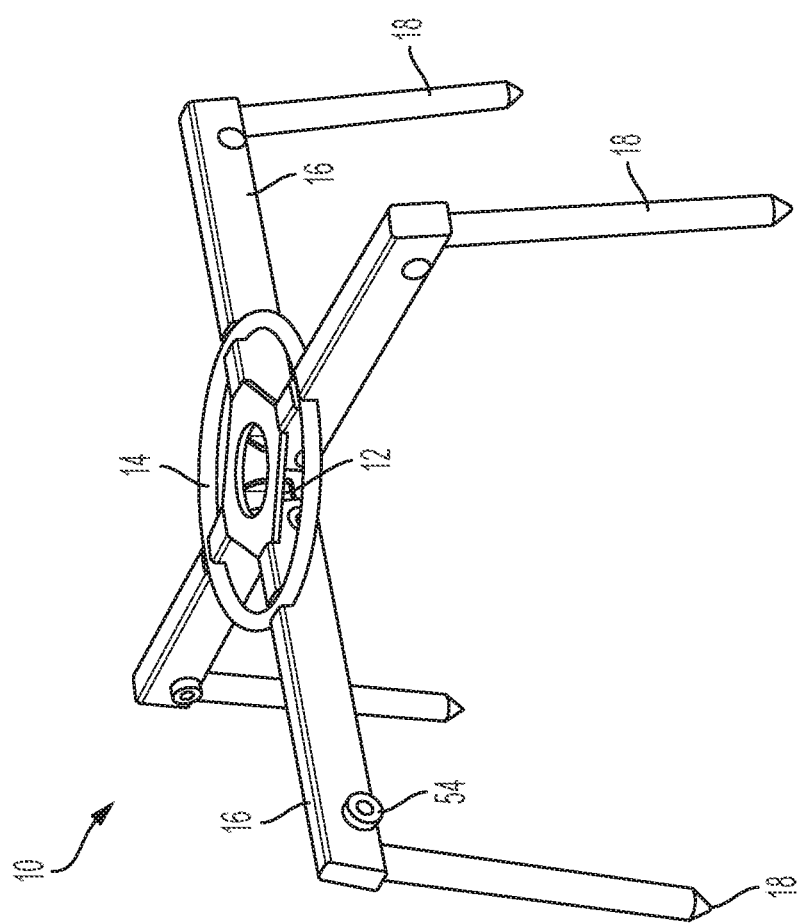

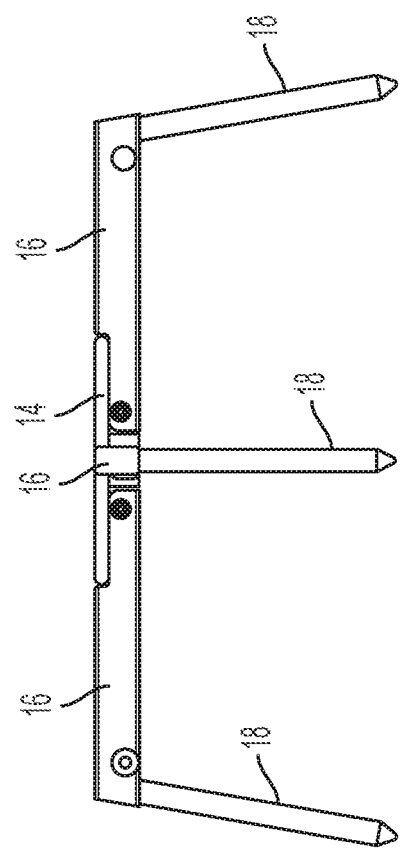
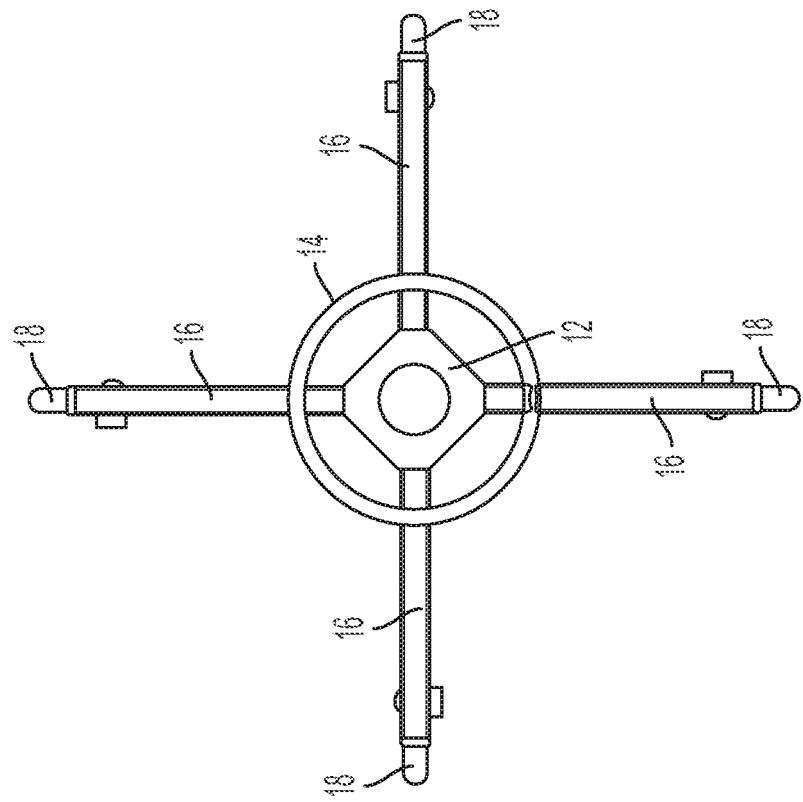
FIG. 3
FIG. 2

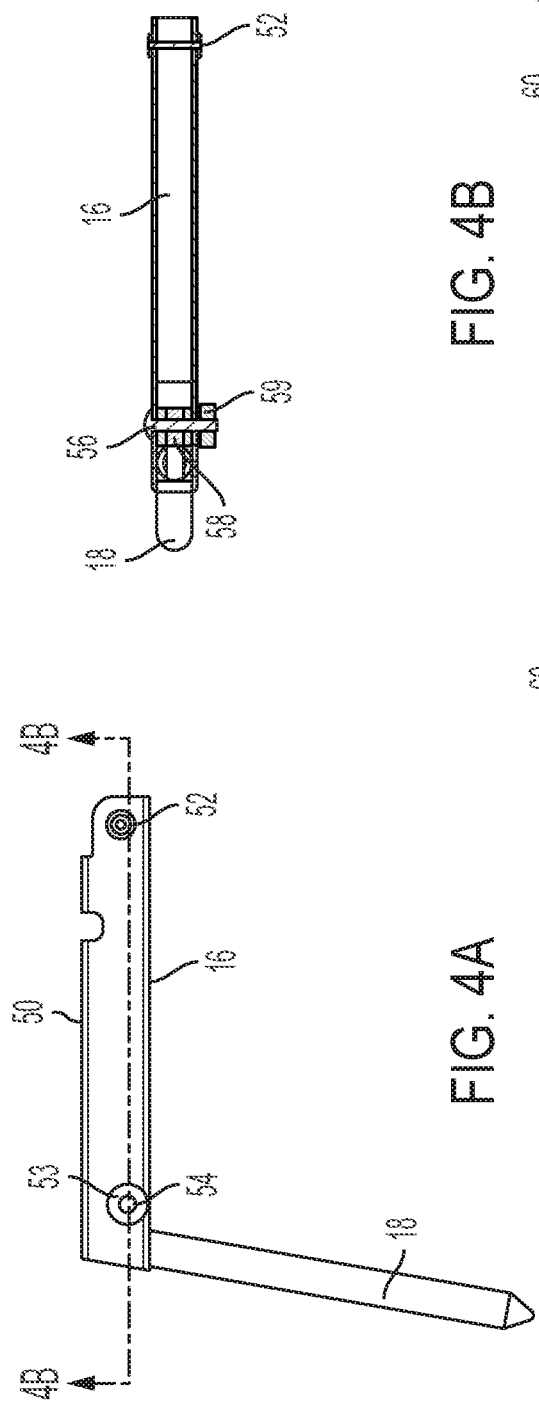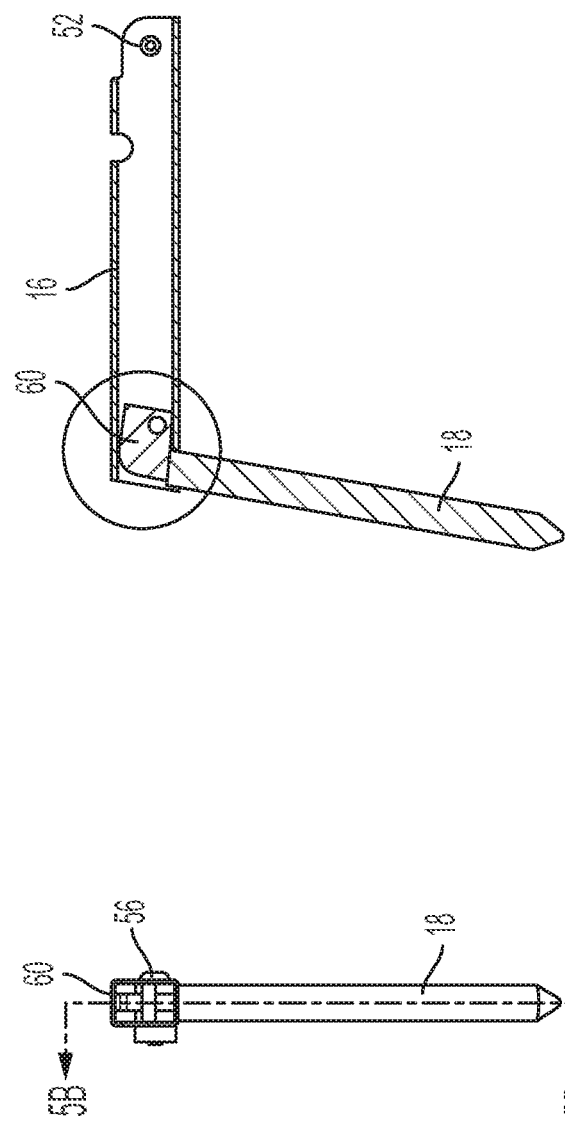
FIG. 4A
FIG. 4B
FIG. 5A
FIG. 5B

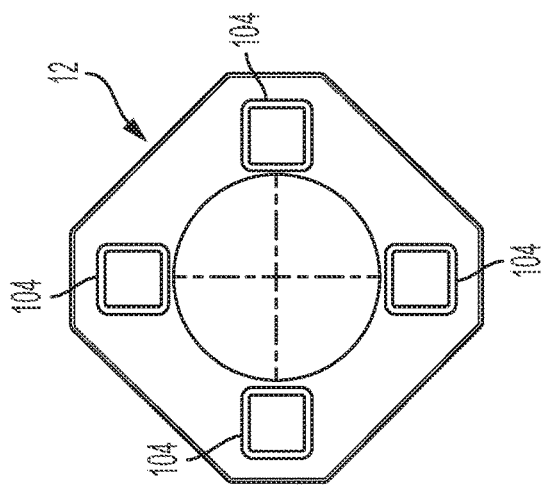
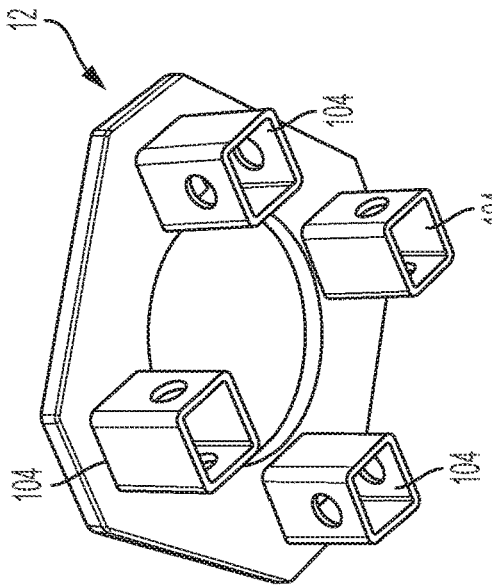
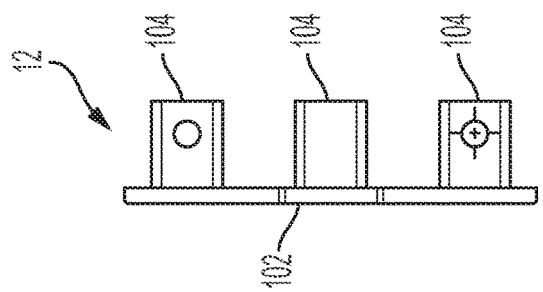
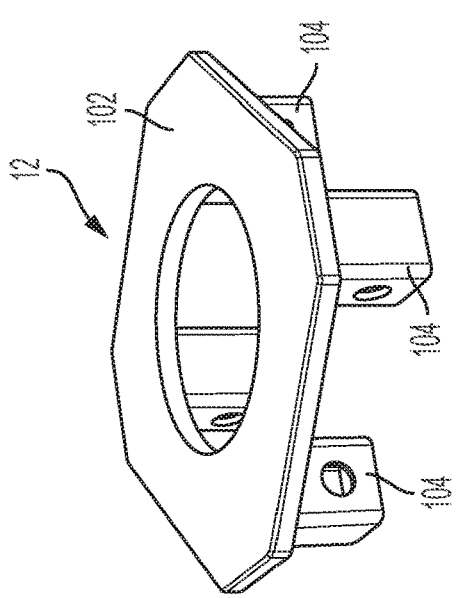
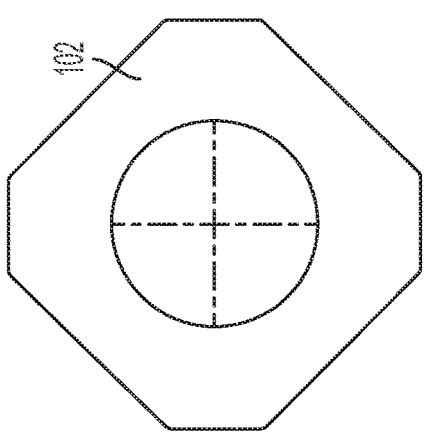

COLLAPSIBLE COOKING RING

FIELD OF THE DISCLOSURE

The present description relates generally to portable cooking solutions, and more particularly to a collapsible cooking ring.

BACKGROUND OF RELATED ART

It is known that a variety of methods may be used to position a cooking element over a fire, such as an open flame, outdoor camping fire. Because a camping fire is often built in an unprepared area, many technological solutions have been introduced to allow a pan or other dishware to be cooked in or near the fire. These solutions often include methods of protecting or distancing the object to be cooked from the source of the heat.

For instance, U.S. Pat. No. 3,837,328 describes "[a] collapsible grill for camping, the grill having a grate with a plurality of interlinked cross members which can be rolled up or opened to a rectangular grate, the grate is supported on a pair of crossed support members which are elevated above the ground by four support legs hinged thereto, the legs having a notched projection to which the corners of the grill can be attached."

For instance, U.S. Pat. No. 9,357,875 meanwhile describes a "combination outdoor cooking and firewood support apparatus having a frusto-conical frame designed to support firewood in a substantially upright orientation along a periphery of the frame in a manner such that the firewood lean toward the center of the frame. A cooking grate can be positioned on the upper end of the frame over the interior area so that food can be cooked over heat generated by the leftover coal from the burnt firewood that fell into the interior area of the frame. The apparatus can be collapsed into a flattened configuration when some of the arms are detached from at least one of the frame members while other arms remain attached to the frame members."

While the above mentioned patents may be suitable as described there is a recognizable need for improvement to the noted apparatus.

BRIEF DESCRIPTION OF THE DRAWINGS

FIG. 1A is a perspective view of an example collapsible cooking device, according teachings of the present disclosure, showing the device in an open position.

FIG. 1B is an elevated view of the example collapsible cooking device of FIG. 1A, showing the device in a folded position.

FIG. 2 is a top plan view of the example collapsible cooking device of FIG. 1A in an open position.

FIG. 3 is a side view of the example collapsible cooking device of FIG. 1A in an open position.

FIG. 4A is a side elevational view of an example arm and leg apparatus for use in the example device of FIG. 1A.

FIG. 4B is a cross-sectional view of an arm and leg apparatus of FIG. 5A taken along the line B-B of FIG. 4A.

FIG. 5A is an end view of the example arm and leg apparatus of FIG. 4A.

FIG. 5B is a cross-sectional view of an arm and leg apparatus of FIG. 4A, taken along the line A-A of FIG. 5A.

FIG. 9A is a perspective view of an example hub for use in the example device of FIG. 1A.

FIG. 9B is another perspective view of the lower side of the hub FIG. 9A.

FIG. 9C is a top elevation view of the example hub of FIG. 9A.

FIG. 9D is a side elevation view of the example hub of FIG. 9A.

FIG. 9E is a bottom view of the example hub of FIG. 9A.

DETAILED DESCRIPTION

The following description of example methods and apparatus is not intended to limit the scope of the description to the precise form or forms detailed herein. Instead the following disclosure is intended to be illustrative so that others may follow its teachings.

Figure 1C:
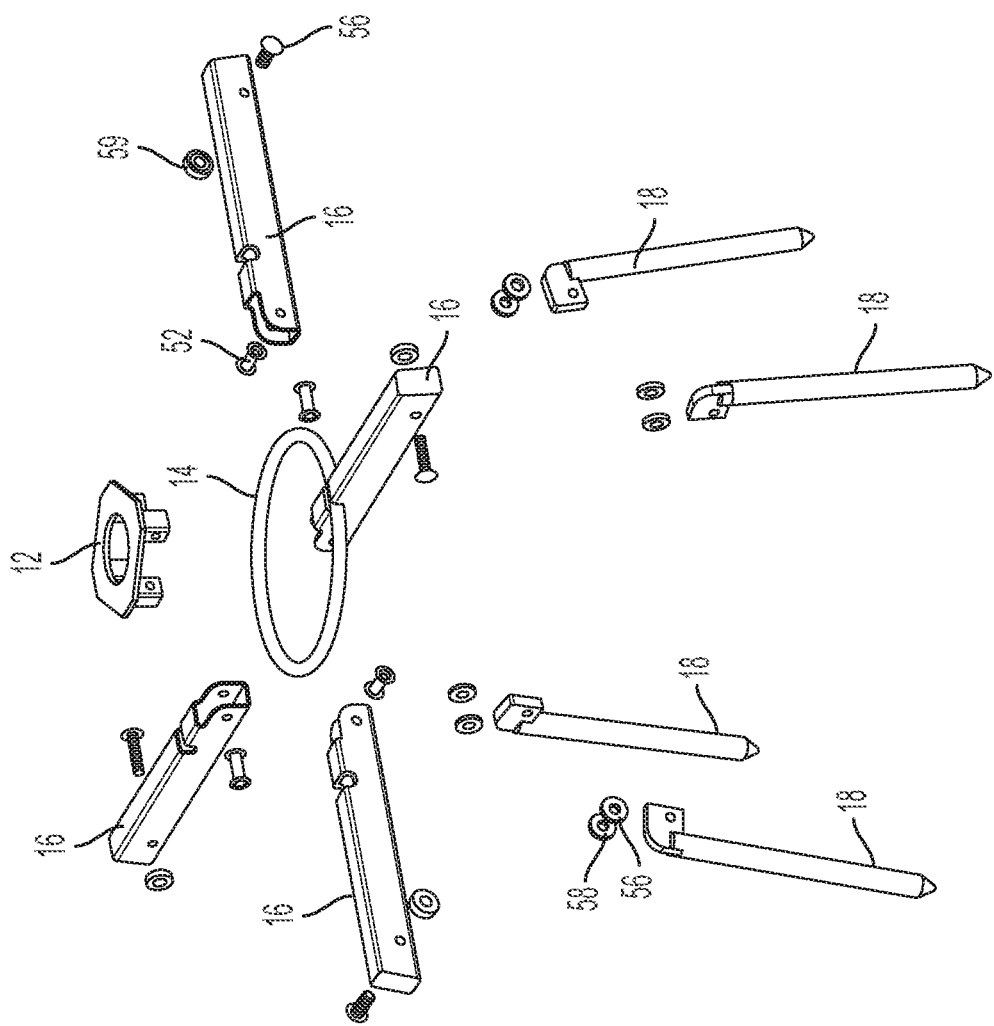
FIG. 1C is an exploded view of the example collapsible cooking device of FIG. 1A.

Referring now to the figures, an example collapsible cooking device 10 according to the teachings of the present disclosure is shown. The example collapsible cooking device 10 generally comprises a central hub 12, a support ring 14, a plurality of arms 16 pivotably coupled to the hub 12, and a plurality of legs 18 pivotably coupled to each of the arms 16. More specifically as illustrated in the present example a central hub 12 includes a rotatable connection to a first end of each of the plurality of arms 16 while each of the arms 16 includes a rotatable connection to a respective leg 18 at a second end of the each of the arms 16. The central hub 12 serves as both a supporting surface and a central connection point for each of the arms 16 in a working arrangement which allows the device to fold compactly as disclosed in detail below. In the illustrated example, the arms 16 and legs 18 are each monolithic, but it will be appreciated that the arms 16 and/or legs 18 may be multi-segment and/or telescoping for sizing and/or compression for efficient storage. FIG. 1B shows an exploded view of the example collapsible cooking device 10.

Referring further to FIG. 2-3, the deployed collapsible cooking device 10 is shown in the top view and side views respectively. The collapsible cooking device 10 may be used to support a pan, pot, or other cooking object (not shown) as desired. In one example of the collapsible cooking device 10, the device is rated for 60 lbs of support. It will be appreciated that depending upon the desired rating, the construction of the device 10 (e.g. materials, dimensions, construction, etc.) may be varied to obtain different support ratings.

FIG. 4A shows an example nesting configuration for one of the example arm 16 and leg 18. Rather, this example arm 16 is adapted to place a top surface 50 of the arm co-planar with the top of the hub 12 allowing top surface 50 of the arm 16 to support any object placed on the collapsible cooking device 10. In some configurations, another example arm 16 could include an external supplemental support surface permanently affixed to or formed with the arm 16 that would serve a similar function to the previously discussed support ring 14 by providing a flat plane to support a cooking object.

To connect the arm 16 to the hub 12, a pivotable connection 52 is accomplished by a steel rivet in the example shown in FIG. 4A at a first end of the arm 16, which allows the arm 16 to reorient the legs 16 and deploy the device from the open position into the collapsed position. The legs 18 are pivotable connected to a second end of the arm 16. Other rotatable connections are considered like a carriage bolt or any other suitable means as shown in FIG. 4B which shows a cross-sectional view of an arm and leg apparatus of FIG. 4A taken along line B-B. In some examples of the collapsible cooking device 10, the legs are angled at 10 degrees off the vertical when the device 10 is in the open position as over a fire. Similarly, the leg 18 is connected to the arm 16 via a pivotable connection 54 which is shown in this example, as a carriage bolt. This connection can be tightened and/or removed by the user with a thumb nut 53. In this connection, the bolt is separated from the arm 16 with a washer 56 as shown in FIG. 4B. This rotatable connection, also seen in FIG. 5A, is an end view of an arm 16 and leg 18 apparatus. In some examples, the leg 18 is dimensioned as a 16 mm rod.

A cross-sectional view of the leg 18 is shown in FIG. 5B of an arm 16 and leg 18 apparatus of FIG. 5A taken along line A-A. In FIG. 5B, the upper portion of the leg 18 that is coupled within a cavity of the arm 16 is shown including a cam 60. The cam 60 allows the motion of the leg 18 to be controlled by imposing a defined range of motion to the leg 18 when used in cooperation with a stop 62. It is also contemplated that the cam 60 and the stop 62 could be shaped into the arm 16 instead of leg 18 or any other suitable restrictions on movement could be used. In the shown example, the upper portion of the leg 18 including the cam 60 and stop 62 is welded to a spiked rod to form the lower portion of the leg 18. The rotatable connection 54 is also shown in FIG. 5B. The rotatable connection 54 is not centered in the arm, but is positioned such that the cavity formed by the arm 16 can partially or fully contain the leg 18 in a fully collapsed configuration or an open position.

Figure 6A:
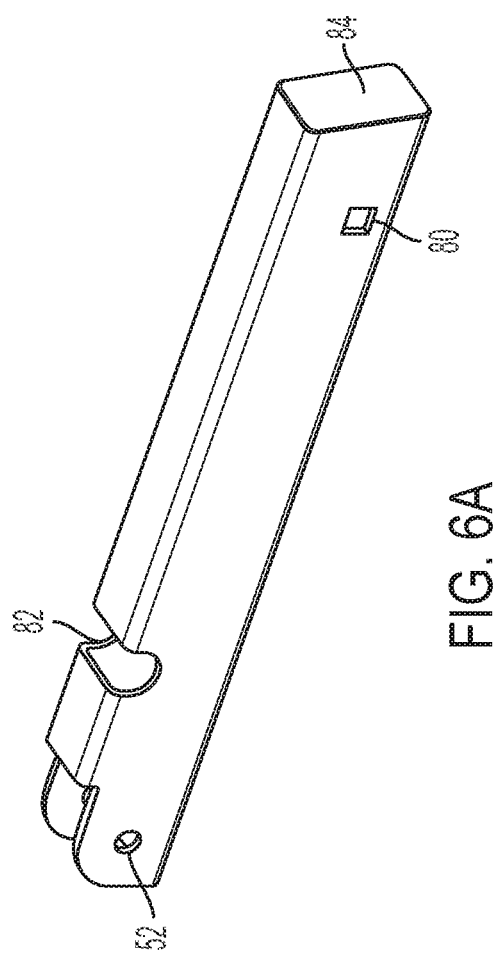
FIG. 6A is a perspective view of an example arm of FIG. 6A apparatus for use in the example collapsible cooking device of FIG. 1A.
Figure 6C:
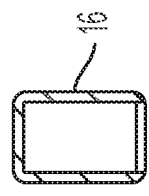
FIG. 6C is an end elevational view of an arm of FIG. 6A.
Figure 6B:
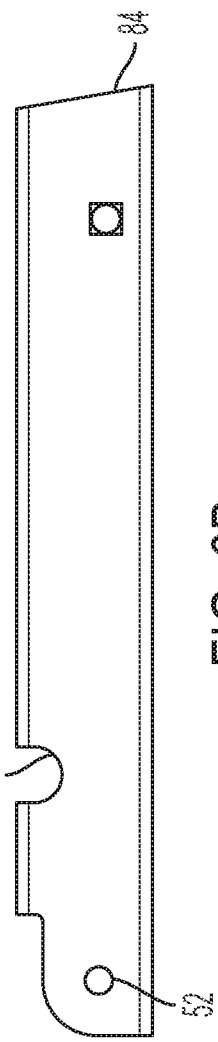
FIG. 6B is a side elevational view of the example arm of FIG. 6A.
Figure 6D:
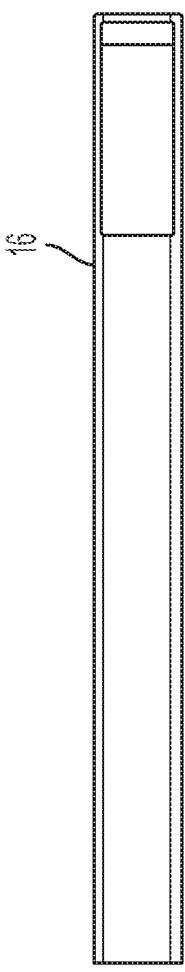
FIG. 6D is a bottom elevational view of an arm of FIG. 6A.

FIGS. 6A-6C depict an example leg 18 according to the teaching of the present disclosure shown alone. In FIG. 6A, the leg opening 72 is shown which enables the pivotable connection 54. In the shown example, the legs lower portion are shaped as a spike so as to pierce the ground with the pointed tip 70. The example leg 18 has a pointed tip 70 is blunted with sloped sides at approximately 60 degrees. In this example, the leg 18 is approximately 8 inches long.

Figure 7A:
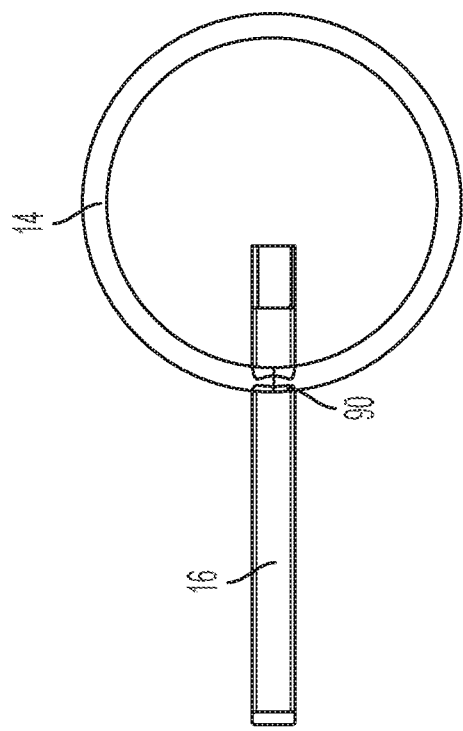
FIG. 7A is a perspective view of an example arm including a support ring for use in the example device of FIG. 1A.
Figure 7B:
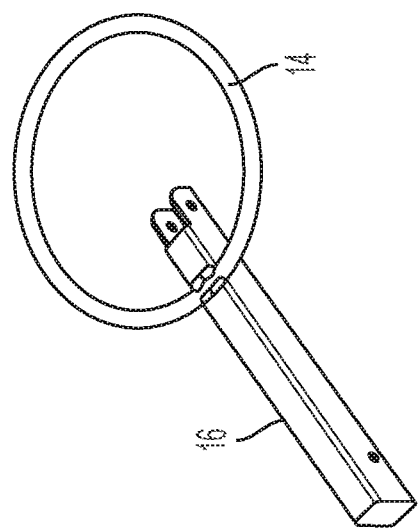
FIG. 7B is a top plan view of the example arm of FIG. 7A.
Figure 7C:
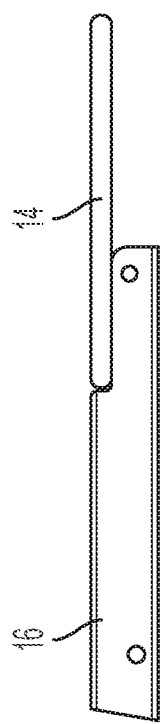
FIG. 7C is a side elevational view of the example arm of FIG. 7A.

FIGS. 7A-7D show another example arm 16 according to the teaching of the present disclosure without the leg 18 or hub 12 shown. The aperture 52 is visible as well as the arm opening 80 for mounting the pivotable connection 54 previously discussed with regard to FIGS. 5A-B. The arm 16 in the example shown has a receiving opening 82 for the supporting ring 14. These openings 82 are sized and shaped to allow the top of the ring 14 to be level with the top of the hub 12 and arm 16 when the device is fully opened. The cross-sectional view in FIG. 7C is taken along the line E-E. The arm 16 body is hollow in the example shown and open on one side as mentioned above to allow the leg 18 to fold within the arm 16. The hollow body of the example arm 16 is covered with a cap 84. In some examples of the arm 16, the body is shaped from a tube of 20×30 mm.

Figure 8C:
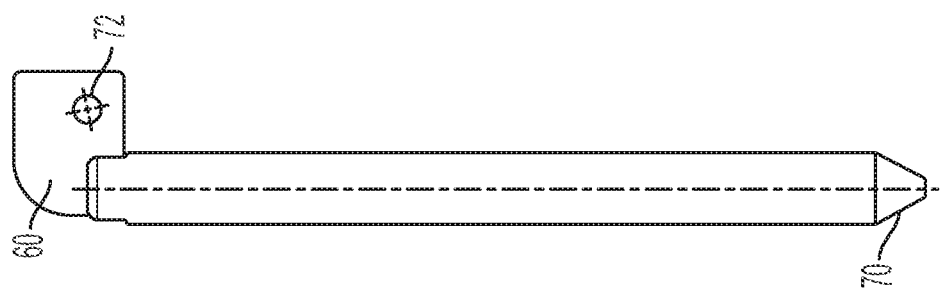
FIG. 8C is a left side elevation view of the example arm of FIG. 8A.
Figure 8B:
FIG. 8B is a front side elevation view of the example arm of FIG. 8A.
Figure 8A:
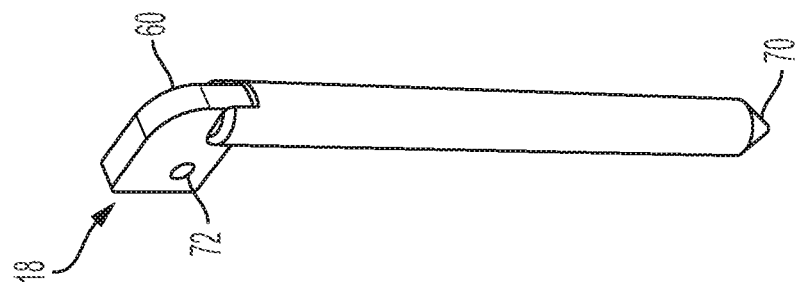
FIG. 8A is a perspective view of an example leg for use in the example device of FIG. 1A.

Another example arm 16 connected to the support ring 14 is shown in FIGS. 8A-8C. This arm 16 in the example shown is similar to the other arms 16, but additionally includes a connection 90 to the support ring 14. The connection in the example shown is a weld, but other means of joining the ring 14 to the arm 16 like adhesives, rivets, or any other suitable mechanical and chemical joining means are contemplated. In some other examples of the collapsible cooking device 10, the support ring 14 is replaced with a solid cooking surface. The solid cooking surface can be connected only to one arm or formed from an interlocking or complimentary portion on each of the arms.

The hub 12 is shown in FIGS. 9A-9E. The upper surface 102 of the hub 12 is used in harmony with the other co-planar surfaces in the folded position to support the cooking target. The materials of the collapsible cooking device 10 are selected to be fireproof and otherwise undamaged in a standard wood fire. The length of the legs is calibrated to allow a full fire underneath the device, but also keep the cooking material out of the direct smoke and/or fire.

Figure 10B:
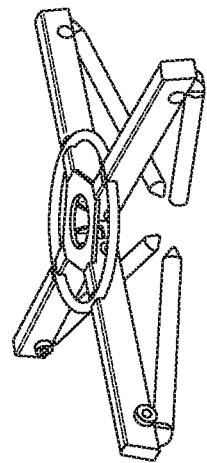
FIG. 10B shows the example collapsible cooking device of FIG. 1A with the legs folding into the arms.
Figure 10D:
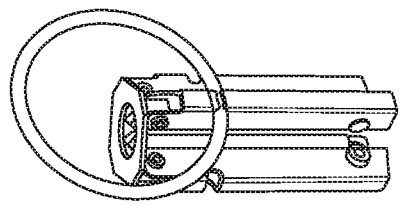
FIG. 10D shows the example collapsible cooking device of FIG. 1A in the folded position.
Figure 10A:
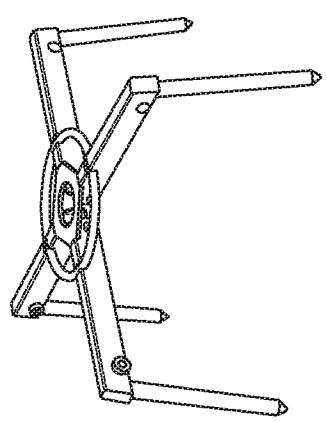
FIG. 10A shows the example collapsible cooking device of FIG. 1A in an open position.
Figure 10C:
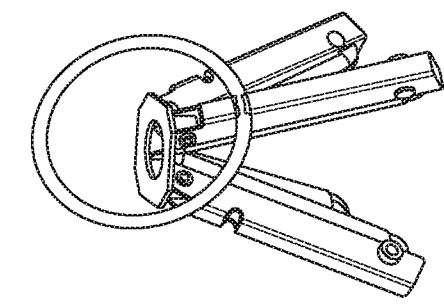
FIG. 10C shows the example collapsible cooking device of FIG. 1A with the arms folding into the arms.

FIGS. 10A-D show a method of using the example collapsible cooking device 10 according to the teaching of the present disclosure. Starting from the folded position shown in FIG. 10A, the legs of the device are unfolded and arms arrayed into a functional position to support a pot, pan, or other object to be cooked. In order to stow the device away for storage, the user folds the legs 18 into the arms 16 as shown in FIG. 10B. Following this, the arms 16 are folded toward each other as shown FIG. 10C to compress the size of the device. The folded position of the device 10 is shown in FIG. 10D in this final compact size.

In the foregoing, terms such as, but not limited to, "upper" and "lower," have been used to describe the relative positioning and orientation of various components. These descriptors have been used for illustrative purposes only and should not be understood to convey absolute position or orientation of the device or its components.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

We claim:

1. A collapsible cooking device comprising:
   a central hub with a support surface positioned on a face of the central hub;
   a ring;
   a plurality of arm members rotatably connected to the central hub at a first end of each of the plurality of arm members, wherein each arm member comprises an indentation sized and shaped to receive at least a portion of the ring; and
   a plurality of leg members,
   wherein each leg member is rotatably connected to one of the arm members at a second end of the arm member, wherein each leg member is sized and shaped to nest within a cavity formed within the arm member to which the leg member is rotatably connected;

wherein when the plurality of arm members are deployed they form, together with the ring, a supplemental support surface.

2. The collapsible cooking device of claim 1 wherein an interior surface of one or more of the plurality of arm members limits rotation of one or more of the plurality of leg members.

3. The collapsible cooking device of claim 2 wherein an upper portion of each leg member further includes a cam that limits the rotation of the leg member in another direction.

4. The collapsible cooking device of claim 1 wherein each of the plurality of arm members further comprises an upper surface that, when the plurality of arm members are deployed, is flush with the support surface of the central hub.

5. The collapsible cooking device of claim 4 wherein the support surface of the central hub and supplemental support surface are aligned in a co-planar relationship.

6. The collapsible cooking device of claim 1 wherein one or more of the plurality of leg members further includes a pointed spike.

7. The collapsible cooking device of claim 1 wherein a resistance to rotate the plurality of leg members is adjustable.

8. The collapsible cooking device of claim 7 further comprising a thumb nut which adjusts the resistance to rotate the plurality of leg members by applying torque.

* * * * *